Feb. 5, 1963 — O. E. E. STROMBERG — 3,076,313
AUXILIARY CONTROL FOR AUTOMOBILE BRAKES
Filed Feb. 4, 1958 — 2 Sheets-Sheet 1
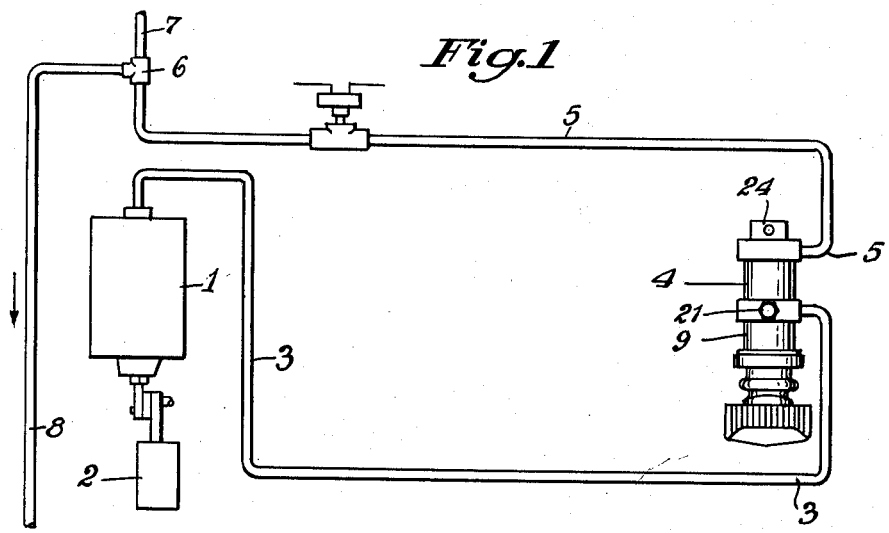
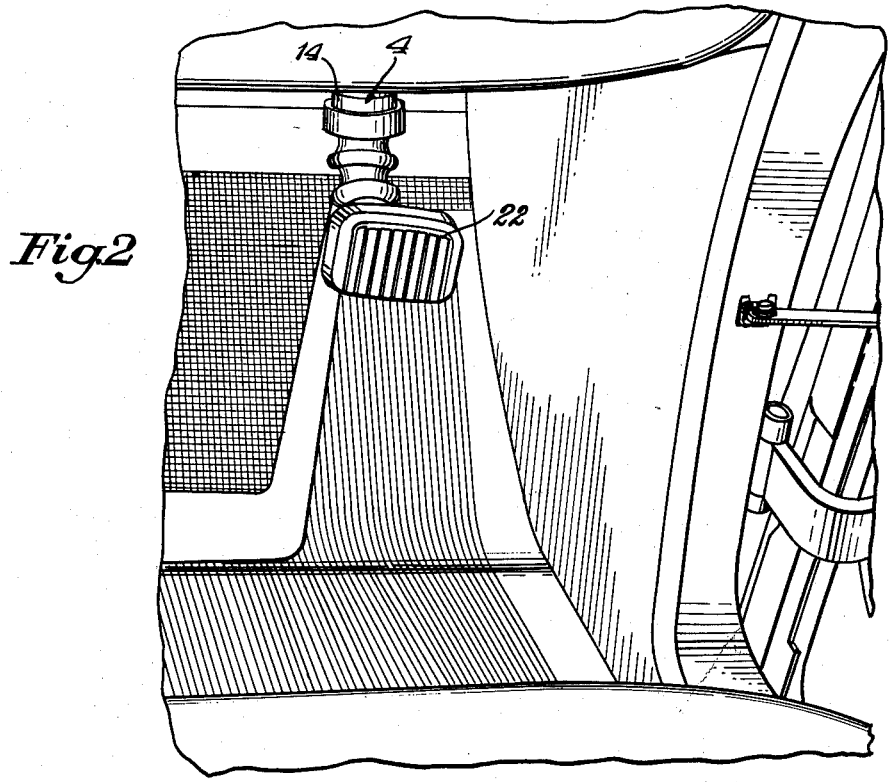
INVENTOR.
Olof E.E. Stromberg
BY
Parker & Carter
Attorneys Feb. 5, 1963  O. E. E. STROMBERG  3,076,313
AUXILIARY CONTROL FOR AUTOMOBILE BRAKES
Filed Feb. 4, 1958  2 Sheets-Sheet 2
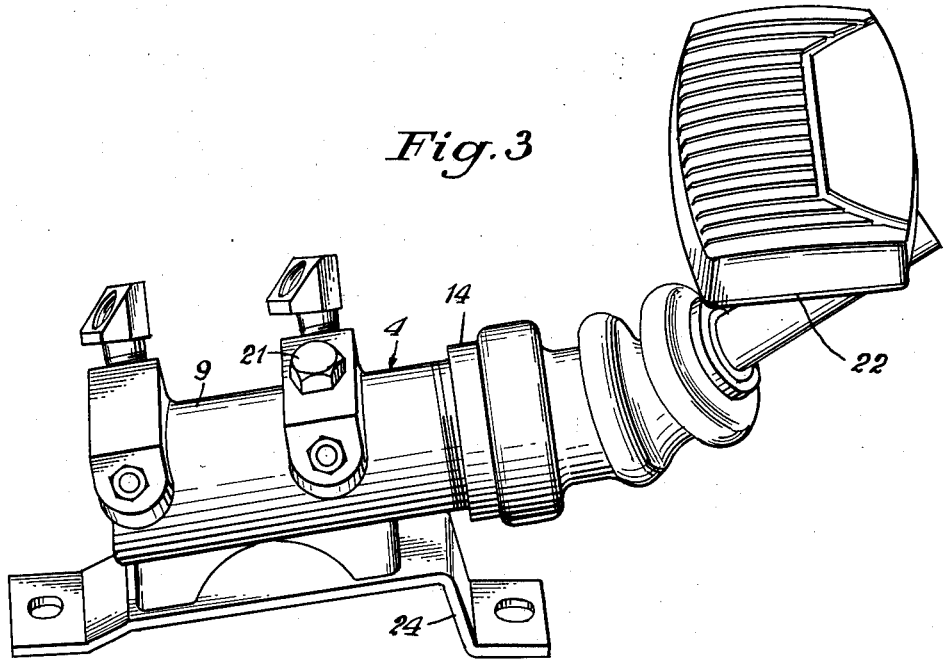
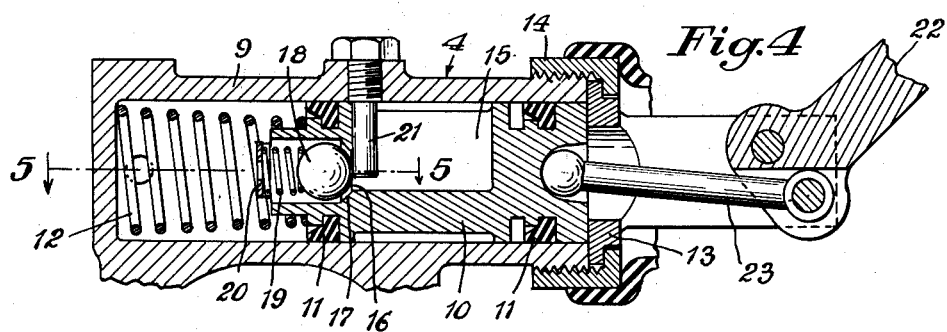
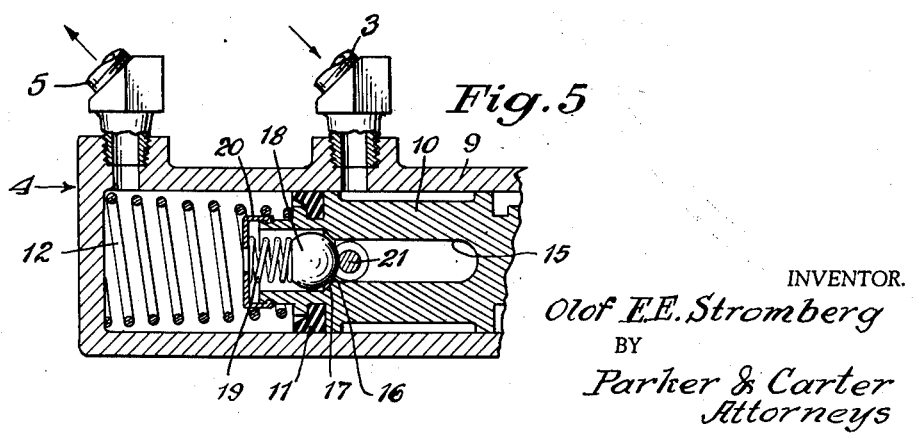
INVENTOR.
Olof E.E. Stromberg
BY
Parker & Carter
Attorneys

United States Patent Office 3,076,313
Patented Feb. 5, 1963

3,076,313
AUXILIARY CONTROL FOR AUTOMOBILE BRAKES
Olof E. E. Stromberg, 5453 Northwest Highway, Chicago, Ill.
Filed Feb. 4, 1958, Ser. No. 713,197
1 Claim. (Cl. 60—54.5)

My invention relates to improvements in hydraulic brakes for motor vehicles and the like and has for one object to provide means which may be used in connection with the conventional foot operated master cylinder of a hydraulic brake system to make it possible for another passenger without touching the master cylinder pedal to apply the brakes.

Another object of my invention is to provide in association with the usual hydraulic brake system a separate brake applying element which may be used to apply pressure in a hydraulic braking system altogether independent of the usual brake pedal without in any way interfering with the operation of the brake pedal.

Other objects will appear from time to time in the course of the specification and claim.

My invention is illustrated more or less diagrammatically in the accompanying drawings, wherein—

FIGURE 1 is a diagrammatic flow sheet illustrating my invention;

FIGURE 2 is a diagrammatic view of the driver's compartment of an automobile showing a convenient relative positioning of the conventional brake and my attachment;

FIGURE 3 is a side elevation of my attachment;

FIGURE 4 is a vertical section of FIGURE 3 with parts broken away;

FIGURE 5 is a section along the line 5—5 of FIGURE 4.

Like parts are indicated by like characters throughout the specification and drawings.

I have not illustrated the brakes themselves as they are conventional.

The vehicle master cylinder 1 when pressure is applied to the foot pedal 2 forces hydraulic fluid outwardly through the line 3 to my control unit 4, through which fluid may freely flow through duct 5 to T6, whence fluid goes through ducts 7 and 8 to the brakes in the usual way.

My control unit 4 includes a cylinder 9 closed at one end and open at the other. Slidably mounted in the cylinder is a plunger 10 having packing rings 11. A spring 12 biases the plunger toward outward position against the annular stop ring 13 held to the cylinder by the threaded cap 14. The plunger 10 is slotted at 15 and is centrally apertured in opposition to the closed end of the cylinder 9 as at 16, the aperture being bounded by a valve seat 17 on which seats a ball valve 18 normally biased toward seating by a spring 19 in the cage 20. A pin 21 extending inwardly from the wall of the cylinder 9 into the slot 15 engages the valve when the plunger is in its outer position to unseat it. Under ordinary circumstances the plunger 10 remains in its outer position, the valve 18 is unseated and my control unit offers no resistance to movement of hydraulic fluid in either direction through the control unit.

A pedal 22 is connected by thrust rod 23 to the plunger 10 so that foot pressure on the pedal compresses the spring 12, moves the plunger 10 inwardly, allows the valve 18 to seat and further movement of the plunger quite independent of the situation prevailing in the vehicle master cylinder applies pressure to the interior of the cylinder, forcing further movement of fluid outwardly through the duct 5. It will be understood that when the plunger is in the outward position, fluid entering through duct 3 passes through and out through duct 5 just as if my control unit were not in existence.

My device may be applied to the usual automobile dash by bolting the brackets 24 to the fire wall bounding the front of the driver's compartment, cutting the hydraulic pipe 3 from the master cylinder, connecting it to the inlet end of my control and connecting the part of the pipe 5 to the outlet control so that hydraulic fluid is free to move in the resultant closed position.

By this arrangement there will always be either in the driver's compartment or perhaps in the rear compartment available a suitable hydraulic plunger which when compressed increases the pressure of the fluid in the system. The system is always full of fluid. If the usual foot brake is applied and the passenger applies pressure to the safety control, this has no effect whatever on the system until the passenger's pressure is sufficient to increase pressure in the line, at which time movement of the safety plunger occurs, the check valve 18 seats and without further effect on that part of the system between my control and the master cylinder the brakes are applied and the brake pressure is increased.

If, for example, my apparatus is applied to a car used for driver instruction, the instructor may even though the learner has not applied the brakes at all, instantly apply the brakes but if the learner does his work, the instructor's control does not go into effect, has no influence on the car or on its operation.

I claim:

A driver training automobile braking system, said driver training braking system including a single conventional automobile master cylinder, a plurality of brakes, a hydraulic line between the brakes and master cylinder, and an auxiliary brake cylinder assembly for increasing pressure, under certain conditions, to the brakes independently of master cylinder generated pressure, said auxiliary brake cylinder assembly including an auxiliary cylinder connected in series into the hydraulic line between the master cylinder and the brakes, said auxiliary cylinder having an inlet and outlet which, when connected to the hydraulic line, provide a hydraulic fluid flow path therebetween through the auxiliary cylinder, a piston reciprocable in the auxiliary cylinder, sealing means carried by and entirely bodily movable with the piston, said sealing means including an annular seal in slidable contact with the auxiliary cylinder to thereby prevent leakage of hydraulic fluid past the piston, a stop for limiting the outward excursion of the piston on its return stroke as it moves to a retracted position, the hydraulic fluid flow path being normally open when the piston is in its retracted position to thereby permit unobstructed flow of hydraulic fluid between the master cylinder and the brakes, spring means normally urging the piston outwardly toward the stop, a valve located in the fluid flow path between the inlet and outlet, said valve including a valve member carried by the piston, and a valve seat, valve displacement means in the cylinder, said valve member, when the piston is in its retracted position, being unseated by the valve displacement means to thereby enable fluid to flow through the auxiliary cylinder, second spring means urging the valve member onto the valve seat, said second spring means being effective, when the piston moves in an inwardly, brake applying, extending direction and the outlet pressure exceeds the inlet pressure, to urge the valve member into seating engagement with the valve seat and thereby shut off the hydraulic fluid flow path between the outlet and the master cylinder, and a mechanical linkage for urging the piston inwardly against the biasing force of the spring means to thereby seat the valve member, said mechanical linkage including a foot pedal pivoted about a fixed support, and a rod actuable by the foot pedal and engaging the piston to thereby slide the piston inwardly in a brake applying direction when the foot pedal is rotated about its pivot to thereby increase the braking pressure in the hydraulic line between the outlet and the brakes independently of master cylinder generated pressure.

References Cited in the file of this patent
UNITED STATES PATENTS

| | | |
|---|---|---|
| 2,024,549 | Tarris | Dec. 17, 1935 |
| 2,213,947 | Bowen | Sept. 10, 1940 |
| 2,262,843 | Goepfrich | Nov. 18, 1941 |
| 2,299,932 | Scott | Oct. 27, 1942 |
| 2,441,040 | Sprague et al. | May 4, 1948 |
| 2,704,585 | Stromberg | Mar. 22, 1955 |